(12) United States Patent
Tanizawa et al.

(10) Patent No.: US 7,395,750 B2
(45) Date of Patent: Jul. 8, 2008

(54) PRESSURE VESSEL, COMPRESSOR AND PROCESS FOR CASTING CYLINDER BLOCK

(75) Inventors: Motoharu Tanizawa, Kariya (JP); Kyoichi Kinoshita, Kariya (JP); Yuki Okamoto, Kariya (JP); Tsukasa Sugie, Kariya (JP); Manabu Sugiura, Kariya (JP); Takayuki Kato, Kariya (JP); Fuminobu Enokijima, Kariya (JP)

(73) Assignee: Kabushiki Kaisha Toyota Jidoshokki, Kariya-shi (JP)

( * ) Notice: Subject to any disclaimer, the term of this patent is extended or adjusted under 35 U.S.C. 154(b) by 147 days.

(21) Appl. No.: 10/586,893

(22) PCT Filed: Oct. 19, 2005

(86) PCT No.: PCT/JP2005/019734

§ 371 (c)(1),
(2), (4) Date: Jul. 20, 2006

(87) PCT Pub. No.: WO2006/049066

PCT Pub. Date: May 11, 2006

(65) Prior Publication Data

US 2007/0158000 A1    Jul. 12, 2007

(30) Foreign Application Priority Data

Nov. 1, 2004    (JP)    ............................. 2004-318074

(51) Int. Cl.
*F16J 10/00*    (2006.01)

(52) U.S. Cl. ..................................... 92/169.2

(58) Field of Classification Search .................... 92/71, 92/155, 169.1, 169.2
See application file for complete search history.

(56) References Cited

U.S. PATENT DOCUMENTS 5,080,056 A * 1/1992 Kramer et al. ............. 92/169.1

(Continued)

FOREIGN PATENT DOCUMENTS

JP    53-85723    7/1978

(Continued)

OTHER PUBLICATIONS

English translation of the International Preliminary Report on Patentability dated May 10, 2007, Application No. PCT/JP2005/019734.

(Continued)

*Primary Examiner*—Michael Leslie
(74) *Attorney, Agent, or Firm*—Morgan & Finnegan, LLP

(57) ABSTRACT

A pressure vessel of the present invention is such that at least part thereof comprises a metallic composite material 40 comprising alight metal 41, which is turned into a matrix, and a plateshaped iron-basedmember 42, which is buried in the light metal 41, whose major component is iron, and which is provided with a large number of through holes penetrating the front and rear surfaces. By means of this construction, it is possible to provide a pressure vessel having a novel construction whose pressure resistance is enhanced without being accompanied by thickening, and a compressor being provided with a housing comprising the pressure vessel.

Moreover, a casting process of the present invention is a casting process, which is suitable for producing cylinder blocks, and is characterized in that, in a casting mold 80 being provided with hollow portions (86, 87) forming a molding cavity surface 84, and a pouring passage 85 which is communicated with the hollow portions, a substantially cylindrical iron-based member 42 having cut-offs 45 at the opened end portions is allocated so that the opened end portions are brought into contact with the molding cavity surface 84 and spaces 86, 87 are provided on the front- and rear-surface sides of the iron-based member 42, and a light-metal molten metal 41' is filled into the entire hollow portions through the pouring passage 85 via the cut-offs 45, thereby casting the light metal 41 around the iron-based member 42.

17 Claims, 7 Drawing Sheets

U.S. PATENT DOCUMENTS 6,432,557 B2* 8/2002 Takehana et al. .............. 92/172
2005/0274333 A1* 12/2005 Rau et al. ................ 123/41.84

FOREIGN PATENT DOCUMENTS

| JP | 53-111518 | 9/1978 |
| JP | 59-74353 | 4/1984 |
| JP | 1-165744 | 6/1989 |
| JP | 2-84244 | 3/1990 |
| JP | 5-31566 | 2/1993 |
| JP | 10-318038 | 12/1998 |
| JP | 2000-514522 | 10/2000 |
| JP | 2004-218585 | 8/2004 |

OTHER PUBLICATIONS

English translation of the International Preliminary Report on Patentability dated Jun. 14, 2007, Application No. PCT/JP2005/019734.
PCT International Search Report mailed Dec. 20, 2005 in corresponding PCT international application PCT/JP2005/019734.

* cited by examiner

PRESSURE VESSEL, COMPRESSOR AND PROCESS FOR CASTING CYLINDER BLOCK

TECHNICAL FIELD

The present invention relates to a pressure vessel for accommodating pressurized substances such as gases.

BACKGROUND ART

A pressure vessel is used as a housing, and the like, for a compressor, such as an air conditioner, which is carried by an automobile, for instance, and has been required to reduce the weight recently. Accordingly, for housings of compressors in which pressure resistance is said to be required, light metals, such as aluminum and magnesium, whose densities are small, have been employed.

However, in a simple light-metal cast product, it is difficult to obtain the strength which is required for housings of compressors (the tensile strength is 200 MPa approximately in aluminum cast products), and the strength under high-temperature environment degrades further (it degrades by 30% or more of that at ordinary temperature in a high-temperature region of 200° C. or more in aluminum cast products). Therefore, in order to obtain a strength to such an extent that satisfies the required pressure resistance, thickening becomes necessary, however, there is a problem that the larger the thickness becomes the more likely it is that cast cavities occur.

In a cylinder block, a constituent member for a housing, a cast-iron liner has been press-fitted into a block body, and so on, which is made of light metal, in order to improve the rigidity of sliding portions and sliding characteristics, such as wear resistance, in order to improve the strength of compressor's housing without being accompanied by thickening. For example, in Japanese Unexamined Patent Publication (KOKAI) No. 59-074,353, an aluminum liner, which is formed by means of drawing process, is cast-wrapped in a cylinder bore, and a flame-sprayed layer is formed on the inner peripheral surface of the liner. Meanwhile, from the viewpoint of the issue of the adhesiveness between block body and cast-iron liner, a liner-less cylinder block, from which a cast-iron liner is abbreviated, has been developed. However, in the liner-less structure, since the rigidity of the sliding surface is low, it might be deformed depending on the extent of heat or internal pressure.

Moreover, in Japanese Unexamined Patent Publication (KOKAI) No. 10-318,038, a silicon-enriched layer, in which primary-crystal silicon is agglomerated, is formed on the inner wall surface of a cylinder bore, using a filtering material which comprises a fine wire material.

DISCLOSURE OF THE INVENTION

Hence, the present inventors thought of a pressure vessel and compressor whose pressure resistance is enhanced by means of a novel structure without being accompanied by thickening, in view of the aforementioned problematic points. Namely, the present invention is such that it is an object to provide a pressure vessel and compressor which have high pressure resistance. Moreover, it is an object to provide a process for casting a cylinder block which is good in terms of the pressure resistance and whose cast qualities are high.

A pressure vessel of the present invention comprises a substantially cylindrical periphery-wall portion having an inner space, and end-wall portions closing the both opposite ends of the periphery-wall portion, and is characterized in that at least part thereof comprises: a metallic composite material comprising: a light metal being turned into a matrix; and a plate-shaped iron-based member which is buried in the light metal, whose major component is iron, which is provided with a large number of through holes penetrating through the front and rear surfaces, and in which the open area ratio is 13-30%.

Here, the iron-based member being "plate-shaped" is a concept, which includes net-shaped bodies comprising a plurality of wire materials if they are those which have rigidity to a certain extent, in addition to expanded metals and punching metals, which can be obtained by processing plate-shaped bodies.

Since at least part of the pressure vessel of the present invention is constituted of the metallic composite material, at least part of the pressure vessel which is completed by burying an iron-based member in a light metal, the pressure resistance is high due to the reinforcement effect resulting from the iron-based member. Further, since the metallic composite material comprises the light metal, it is a pressure vessel, which is lightweight and is good in terms of the pressure resistance. Moreover, since the iron-based member is provided with a large number of through holes penetrating through the front and rear surfaces, the adhesiveness between it and the light metal, being a matrix, can be secured.

And, by adapting the open area ratio of the iron-based member to 13-30%, it becomes a metallic composite material, in which both of the adhesiveness and pressure resistance are satisfactory. When the open area ratio is too large, it becomes difficult to secure high pressure resistance; when the open area ratio is too low, the adhesiveness between the matrix and the iron-based member drops. By adapting the open area ratio to 13-30%, metallic composite materials, in which the pressure resistance and the adhesiveness are well balanced, can be obtained. Further preferably, the open area ratio can be 18-28%.

Moreover, the present inventors paid notice to the fact that the metallic composite material, in which the aforementioned iron-based member is buried in the light metal and which has high strength, demonstrates good effects by using it in parts, at which pressure resistance was desired, especially, to the housings of compressors, in which the fear of degrading the strength might be present for ordinary aluminum materials because they become very high temperatures and are highly pressurized depending on models. Namely, a compressor of the present invention is a compressor having a housing in which a compressing mechanism and a working space for compressing a gas with the compression mechanism are embedded, and is characterized in that at least part of the housing comprises: a metallic composite material comprising: a light metal being turned into a matrix; and a plate-shaped iron-based member which is buried in the light metal, whose major component is iron, which is provided with a large number of through holes penetrating through the front and rear surfaces, and in which the open area ratio is 13-30%.

The "housing" can be those in which a space for compressing a gas with a compression mechanism mainly is embedded, for example, as far as it is a compressor of representative mode which has a piston for compressing a gas by means of a reciprocal movement with a predetermined phase, it can be a cylinder block which is equipped with a plurality of cylinder bores for accommodating pistons, or a front housing which is equipped with a hollow cylinder portion for accommodating driving means for driving a piston. Moreover, even when being a compressor of the other types, it can be those whose modes are equivalent to cylinder blocks or front housings.

In accordance with the compressor of the present invention, since the housing is formed of the metallic composite material, which is provided with the aforementioned constitution, it makes a compressor which is light weight and is good in terms of the heat resistance. Moreover, since the aforementioned iron-based material has a large number of holes which penetrate through the front and rear surfaces, the adhesiveness between it and the light metal being a matrix can be secured. Further, depending on the types of cooling medium used in a compressor, it might become high temperatures (about 180° C. by the employment of $CO_2$) during the compressor's operation, however, as far as being a compressor in which the metallic composite material is used, it shows good pressure resistance without degrading the strength even when it becomes high temperatures.

Said housing can preferably be such that it has an installation portion for fastening the compressor to an installed body, the installation portion protruding outward, formed integrally and comprising said light metal, and the tensile strength of the installation portion is 460 MPa or more. By thus doing, the strength of portions comprising the light metal in which the metallic composite material is not used can be improved, and it makes a compressor which is good in terms of the pressure resistance and in which not only the portion comprising the metallic composite material but also the entire housing are provided with high strength.

Moreover, a casting process of the present invention for a cylinder block is characterized in that it comprises: an iron-based-member allocation step of allocating a substantially cylindrical iron-based member, whose major component is iron, which is provided with a large number of through holes penetrating the front and rear surfaces and whose open area ratio is 13-30%, in a casting mold being provided with a hollow portion forming a molding cavity surface, which corresponds to the shape of a cylinder block, in cooperation with a core for a cylinder bore, and a pouring passage into which a molten metal is poured and which is communicated with the hollow portion, at least, coaxially with the core for a cylinder bore; and a light-metal filling step of filling a molten metal of a light metal into said hollow portion through said pouring passage; wherein said light metal is cast around said iron-based member by way of the steps.

On this occasion, it is desirable that said iron-based member has at least one cut-off at an opened end portion of the iron-based member, the cut-off being larger than the area of one of said through holes, and is allocated so that the opened end portion is brought into contact with said molding cavity surface and spaces are provided on the front- and rear-surface sides of the iron-based member in said iron-based-member allocation step; and the molten metal is filled into the entire hollow portion via the cut-off in said light-metal filling step.

In the casting process of the present invention for a cylinder block, since the open area ratio of the plate-shaped iron-based member is 13-30%, when it is disposed in the casting mold in such a state that the opened end portion of the substantially cylindrical iron-based member is brought into contact with the molding cavity surface, the molten metal of the light metal might be less likely to pass through the through holes of the iron-based member in pouring the molten metal of the light metal into the casting mold. Accordingly, the molten metal of the light metal might not be poured sufficiently into the space, which is positioned on either one of the front- and rear-surface sides of the iron-based member. Hence, when disposing at least one cut-off at the opened end portion of the iron-based member, the molten metal goes to and arrives at the front- and rear-surface sides of the iron-based member sufficiently, and thereby the light metal can be filled into the entire hollow portion satisfactorily. As a result, even when it is poured from the outer-peripheral surface side of the cylinder block, since it is poured up to the cylinder-bore surface, which is positioned on the inner-peripheral surface side, a satisfactory sliding surface is obtained.

BRIEF DESCRIPTION OF THE DRAWINGS

With reference to the following detailed description and the accompanying drawings, the present invention can be understood more profoundly. Hereinafter, the brief description of the drawings is done.

BEST MODE FOR CARRYING OUT THE INVENTION

Figure 1A:
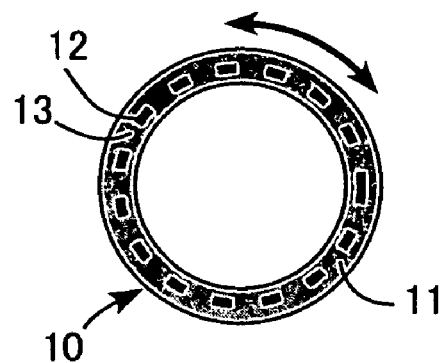
FIG. 1A is a diagram for showing an example of the peripheral-wall portion of a pressure vessel of the present invention, and is a plan view when assuming the peripheral-wall portion to be a hollow cylinder-shaped cylindrical member. Moreover.

In order to explain and describe the present invention in more detail, hereinafter, the best mode for carrying out a pressure vessel of the present invention, a compressor thereof and a casting process thereof for a cylinder block will be explained using FIG. 1-FIG. 4.

Pressure Container

A pressure vessel of the present invention comprises a substantially cylindrical peripheral-wall portion having an internal space, and opposite-end wall portions closing the both opposite ends of the peripheral-wall portion. This pressure vessel is the same as the construction which a general pressure vessel for accommodating various gases, such as CNG (compressed natural gas), LNG (liquefied natural gas) and LPG (liquefied petroleum gas), or various pressurized substances, has.

There are not any limitations on the shapes of the peripheral-wall portion and opposite-end wall portions in particular, however, the peripheral-wall portion can preferably have a substantially cylindrical internal space. Moreover, it is advisable that the opposite-end wall portions can be formed integrally with the peripheral-wall portion. Moreover, in the peripheral-wall portion or opposite-end wall portions, if required, an opening for letting a gas, and the like, flow in or discharge can be disposed.

And, the pressure vessel of the present invention is such that at least part thereof comprises a metallic composite material. Since the metallic composite material comprises a light metal, which is turned into a matrix, and an iron-based member, which is buried in the light metal, it is lightweight and high-strength.

The light metal, which is turned into a matrix, is more lightweight than an iron-based material, which constitutes the iron-based member, at least, and its type is not limited in particular as far as the iron-based member does not melt or degrade when forming the metallic composite material. For example, it is likely to be produced by means of casting when it is a light metal whose melting point is lower than an iron-based material, which constitutes the iron-based member. Specifically, it can preferably be aluminum-based metals, such as pure aluminum and aluminum alloys including Mg, Cu, Zn, Si, Mn, and the like, and magnesium-based metals, such as pure magnesium and magnesium alloys including Zn, Al, Zr, Mn, Th, rare-earth elements, and so forth.

The iron-based member is provided with a large number of through holes, which penetrate through the front and rear surfaces. By having the through holes, when the iron-based member is buried in the light metal, the adhesiveness between both of them can be secured, further, when the open area ratio of the iron-based member is 13-30%, the pressure resistance of the pressure vessel is improved satisfactorily, and thereby the weight can be saved effectively. Further preferably, the open area ratio can be 18-28%. On this occasion, it is preferable that the area of one through hole can be 300 $\mu m^2$ or more. When the area of one through hole falls in the aforementioned range, the adhesiveness between the light metal and the iron-based member can be secured more satisfactorily. The further preferable area of one through hole can be 300 $\mu m^2$-10 $\mu m^2$.

The iron-based member is not limited in particular as far as it is a metal in which iron is the major component and it is plate-shaped, however, it is advisable to use various rolled steel plates (SPCC, SPHC, and the like, according to the JIS notation), which is of good workability. Here, "plate-shaped" can be plate-shaped bodies which are provided with certain extent of rigidity (higher elastic modulus than the light metal, which is turned into a matrix). Namely, even when it is a net-shaped body, such as metallic nets, which comprise a plurality of wire materials, it can be those having rigidity to such an extent that no flexure occurs. Specifically, expanded metals, which are obtained by cutting a large number of slits in plate-shaped bodies and pulling them in the extending direction of plate-shaped bodies, thereby expanding the slits to form through holes; or punching metals, in which a large number of through holes are bored in plate-shaped bodies in the thickness-wise direction mainly. These members can be manufactured easily, and can be procured readily, and are good in terms of the workability. On this occasion, it is preferable that the thickness of the iron-based member can be 0.5-2 mm. When the thickness of the iron-based member falls in the aforementioned range, it is possible to improve the pressure resistance of the pressure vessel satisfactorily, even when being the thickness of 2 mm or less, a sufficient improvement effect is obtained.

Moreover, the iron-based member can preferably be such that its surface is turned into a rough surface. By turning the surface of the iron-based member into a rough surface, the adhesiveness between the light metal and the iron-based member improves. Therefore, the surface roughening can be performed onto the interface of the iron-based member, which contacts with the light metal, at least. The formation of a rough surface can be such that a rough surface is formed by physical methods by means of blast process, such as shot blasting and shot peening, or by chemical methods by means of chemicals.

Moreover, the iron-based member can desirably be such that a carburization treatment is performed. The carburization treatment is a treatment method for hardening the superficial portion alone by increasing the carbon content of the superficial portion by means of infiltrating carbon from the surface of carbon steel. Since a steel plate, which is processed into an expanded metal, and the like, used as the iron-based member, is soft comparatively and is good in terms of the workability, it is desirable to harden it by performing the carburization treatment, and so forth. And, as described above, since the plate thickness of the iron-based member can preferably be 0.5-2 mm, when performing the carburization treatment onto such an iron-based member, carbon infiltrates into the entire iron-based member and thereby it is hardened. The carburization treatment can be such that any one carburization method of solid carburization treatments, liquid carburization treatments, gas carburization treatments and vacuum carburization treatments can employed, however, the iron-based member can be an iron-based hardened member into which carbon and nitrogen are infiltrated in all of the parts in the thickness-wise direction by means of a carbonitriding treatment.

The iron-based member is such that, as far as it is put in a state of being buried in the light metal, its position is not limited at all, and at least part among the compression vessel, especially, the parts, to which high pressures apply, can preferably comprise the metallic composite material. Among them, the iron-based member is buried so that it positions at part of the peripheral-wall portion of the pressure vessel. That is, it is preferable that at least part of said peripheral-wall portion can comprise the metallic composite material. Here, for the explanation, let us assume that the peripheral-wall portion of the pressure vessel is a hollow cylindrical cylinder member like the one shown by the plan views of FIG. 1A and FIG. 2A and the axial cross-sectional views of FIG. 1B and FIG. 2B. In addition to forming the entire cylinder member out of the metallic composite material employing the iron-based member over the entirety, the peripheral-wall portion can be adapted to a peripheral-wall portion (FIGS. 1A and B) employing the iron-based member 22 in parts in the axial direction, or a peripheral-wall portion (FIGS. 2A and B) employing the iron-based member 12 in parts in the peripheral direction; and parts of the peripheral-wall portion can be formed of the metallic composite material 10, 20 (hatched portions in the diagrams); and the other portions can be formed of the light metal 11, 21 (blanked portions in the diagrams). And, the pressure vessel, which uses the aforementioned metallic composite material in at least part thereof, is such that the strength improves, and is thereby good in terms of the pressure resistance. Note that, in FIG. 1 and FIG.

Figure 1B:
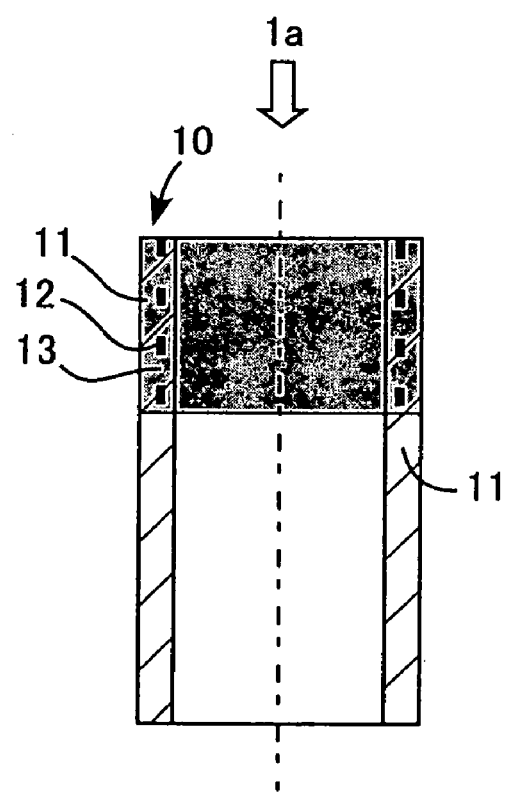
FIG. 1B is an axially cross-section diagram of the cylindrical member of FIG. 1A.
Figure 2A:
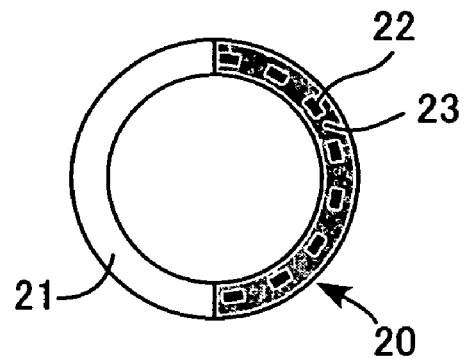
FIG. 2A is a diagram for showing an example of the peripheral-wall portion of a pressure vessel of the present invention, and is a plan view when assuming the peripheral-wall portion to be a hollow cylinder-shaped cylindrical member. Moreover.
Figure 2B:
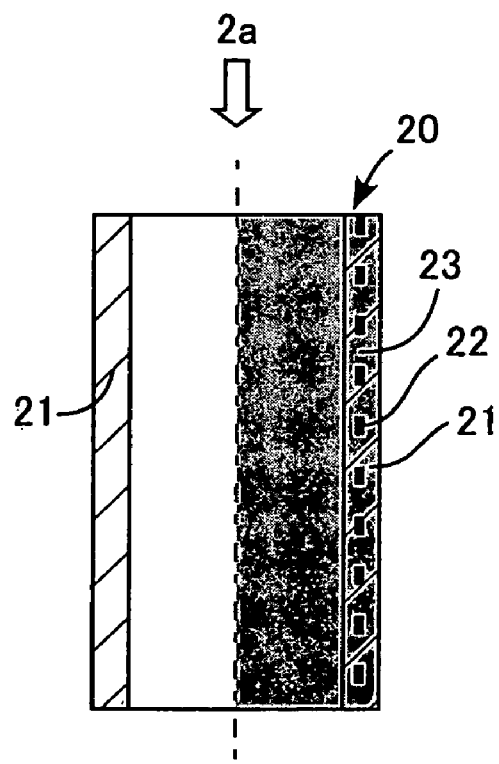
FIG. 2B is an axially cross-section diagram of the cylindrical member of FIG. 2B.

2, 11 and 21 are the light metals; 12 and 22 are the iron-based members; and 13 and 23 are the through holes of the iron-based members 12 and 22; and FIG. 1A and FIG. 2A are plan views when being viewed in the directions of arrow 1a of FIG. 1B and arrow 2a of FIG. 2B.

Further, in the pressure vessel in which a substantially cylindrical iron-based member is buried in the peripheral direction of the peripheral-wall portion (for example, see FIG. 1), not only at the portions in which the iron-based member is buried but also at the end-wall portion, which closes the end of the peripheral-wall portion, the pressure resistance improves as well. This is because, not only the deformation of the peripheral-wall portion, but also the deformation of the end-wall portion are suppressed by the substantially cylindrical iron-based member, which is buried in the peripheral direction. Namely, by performing the minimum reinforcement of the peripheral-wall portion alone by means of the metallic composite material, it is possible to improve the pressure resistance of the entire pressure vessel.

Note that, in the case of allocating the iron-based member so that it is positioned on the inner-peripheral-surface side or the outer-peripheral-surface side of the pressure vessel, it does not matter that part of the iron-based member is put in a state of being exposed in the surface of the pressure vessel.

Moreover, the iron-based member can be buried in the light metal in such a state that it is laminated in a plurality of pieces. As described above, the thin iron-based member of 0.5-2 mm approximately is likely to be carburized or nitrided. Therefore, it is more effective to use a thin iron-based member in a quantity of plural pieces than to use a thick iron-based member in a quantity of one piece. Further, since a thin iron-based member is more likely to be processed into desired shapes, it is advantageous. Moreover, in the case of using a substantially cylindrical iron-based member as shown in FIG. 1, in addition to manufacturing a plurality of cylinder members whose inside diameters differ and inserting them into the cylinders of iron-based members whose inside diameters are larger one after another to laminate them, a flat plate-shaped iron-based member can be superimposed by winding it vortically to laminate it.

Further, in the pressure vessel, it has been understood that a large load applies in the peripheral direction of the peripheral-wall portion mainly (the arrowheaded directions of FIG. 1A), even if there is anisotropy in the strength of the iron-based member, the pressure resistance of the pressure vessel is improved effectively by conforming the highest strength's direction to the peripheral direction in the peripheral-wall portion.

The metallic composite material of the present invention can desirably be produced by means of casting. Specifically, it can be a so-called insert molding method in which a nonferrous metal is cast around an iron-based member by way of an iron-based member allocation step, in which the iron-based member, which has been explained already, is allocated in a casting mold being provided with a hollow portion forming a molding cavity surface, which corresponds to the shape of a pressure vessel, and a pouring passage into which a molten metal is poured and which is communicated with the hollow portion, and a nonferrous-metal filling step, in which a molten metal of a nonferrous metal is filled into the hollow portion through the pouring passage. The casting method as well can use the conventional method, such as gravity casting methods, low-pressure casting methods, molten metal forging methods and die casting methods.

Compressor

In the compressor of the present invention, the housing is one which is equivalent to a so-called pressure vessel, in which a compression mechanism and a working space for compressing a gas with the compression mechanism are embedded, mainly. As for the compressor, such a form, in which a gas is compressed by reciprocating a piston, is a representative one. When being such a compressor, it can be any one of the forms, such as a swash-plate type, a wobble type, a double-headed style, a single-headed style, variable-capacity style and fixed-capacity style. In this case, the housing can be a cylinder block equipped with a plurality of cylinder bores which accommodate a piston for compressing a gas by means of reciprocal movement provided with predetermined phase, or a front housing equipped with a hollow cylinder portion for accommodating driving means for driving a piston. Hereinafter, it will be explained while taking a single-headed style swash-plate type compressor of a variable-capacity style as an example.

Figure 3:
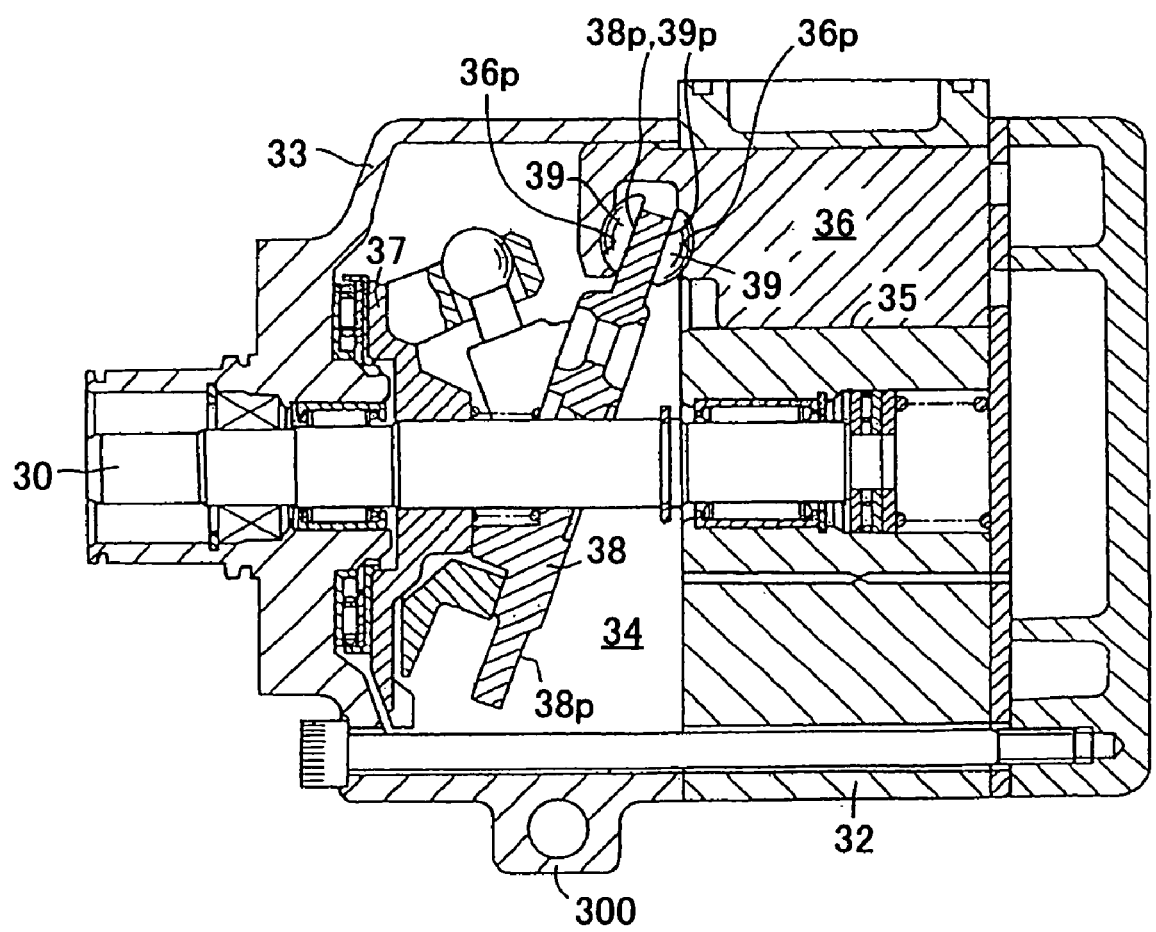
FIG. 3 is a cross-sectional diagram of a swash-plate type compressor being an example of a compressor of the present invention.

In FIG. 3, the construction of the swash-plate type compressor is shown. In the swash-plate type compressor shown in FIG. 3, a driving shaft 30 is accommodated in a swash-plate chamber 34 which is formed by a cylinder block 32 and a front housing 33, and is supported rotatably by a radial bearing. And, within the cylinder block 32, a plurality of cylinder bores 35 are allocated at positions which surround the driving shaft 30. Into each of the respective cylinder bores 35, a single-headed style piston 36 is fitted and inserted reciprocally, respectively. Within the swash-plate chamber 34, a rotor 37 is connected to the driving shaft 30, and a swash plate 38 is fitted at the rear of the rotor 37. In particular, in the compressor of a variable-capacity style, the swash plate 38 is made inclinable around the fulcrum, and accordingly it is made so that the inclination-angle displacement of the swash plate 37 is controlled by means of the equilibrium between gas pressures, which act onto the both end surfaces of the pistons 36, based on the pressure change in the swash-plate chamber 34. Moreover, in the swash plate 38, flat sliding-contact surfaces 38p are formed on the both end-surface outer-periphery sides, and sliding surfaces 39p of shoes 39 are brought into contact with the sliding-contact surfaces 38p. These shoes 39 are engaged with semi-sphere seats 36p of the pistons 36. The pistons 36 coordinate with the swash plate 38 by way of these shoes, and thereby the rotary movement of the swash plate 38 is converted into the linear motion of the pistons 36 so that the compression of medium is carried out. That is, in the swash-plate type compressor shown in FIG. 3, the driving shaft 30 and the swash plate 38, which are included in the compression mechanism, are embedded in the front housing 33, and the working spaces, which are demarcated in the cylinder bores 35, are embedded in the cylinder block 32.

Moreover, it can be a type of compressor other than the aforementioned type. For example, it can be those forms, which correspond to the aforementioned cylinder block and front housing, such as a housing for accommodating scrolling portions when it is a scroll style compressor which has vortex-shaped scrolls as the compression mechanism and in which volume changes are caused in the demarcated spaces to compress a gas, moreover, a housing for accommodating vane portions when it is a vane style compressor which has vanes as the compressor mechanism and in which volume changes are caused in the demarcated spaces to compress a gas.

And, the compressor of the present invention is such that at least part of a housing comprises the above-described metallic composite material. To put it another way, the compressor of the present invention has a housing, which comprises the pressure vessel of the present invention, which has been explained already. Therefore, the housing can preferably be such constructions that include various housing members, such as the cylinder block or front housing which comprises the metallic composite material. Since the metallic composite material comprises the light metal, which is turned into a matrix, and the iron-based member, which is buried in the light metal, the housing, which is formed of the metallic composite material, is lightweight and of high strength. In particular, the cylinder block is such that, when being a linerless structure from which the liner is omitted, the deformations caused by heat or internal pressure are reduced.

Moreover, the housing can preferably have an installation portion for fastening the compressor to an installed body (an engine block, and the like), the installation portion protruding outward, formed integrally and comprising the light metal. There is not any limitation on the shape of the installation portion in particular, however, it can be an installation portion 300 having an insertion hole, into which a bolt is inserted, as shown in FIG. 3. And, the installation portion can be of high strength in order to inhibit the deformations and damages of the installation portion or entire housing which result from stress concentration when being installed, and the tensile strength of the installation portion can desirably be 460 MPa or more. For example, in the case where the light metal constituting the metallic composite material is an aluminum alloy, it is possible to improve the mechanical strength by means of a heat treatment (for instance, a general tempering treatment after quenching designated at T6 according to the thermal refining), as a result, it is possible to make even a portion composed of the light metal alone be of high strength.

Casting Process for Cylinder Block

The cylinder block and pressure vessels of the other types can be cast by casting the light metal around the iron-based member and to desired shapes. Namely, a casting process of the present invention for a cylinder block has an iron-based-member allocation step of allocating a substantially cylindrical iron-based member in a casting mold, and a light-metal filling step of filling a molten metal of a light metal into the casting mold. The iron-based-member allocation step allocates the substantially cylindrical iron-based member in the casting mold, which is provided with a hollow portion forming a molding cavity surface, which corresponds to the shape of a cylinder block, in cooperation with a core for a cylinder bore, and a pouring passage into which a molten metal is poured and which is communicated with the hollow portion, at least, coaxially with the core for a cylinder bore. The light-metal filling step fills the molten metal of the light metal through the pouring passage.

In particular, in the case where the substantially cylindrical iron-based member is buried with a predetermined distance provided from the cylinder bore surface of the cylinder block, it can be cast satisfactorily when using an iron-based member with a cut-off disposed at an opened end portion of the iron-based member. Hereinafter, the casting process of the present invention for a cylinder block will be explained using FIG. 4A and FIG. 4B.

Figure 4A:
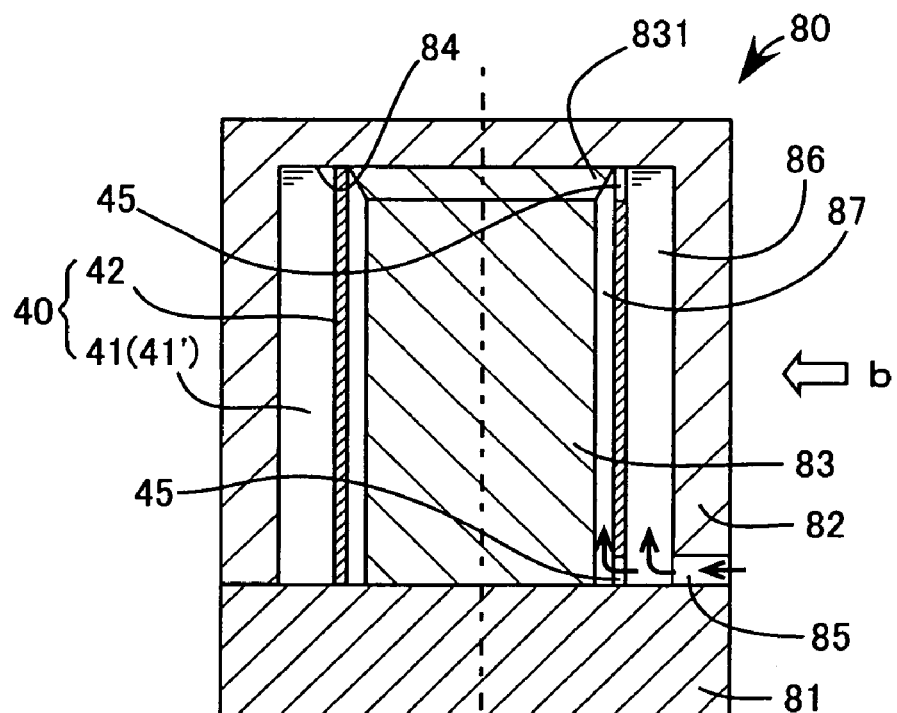
FIG. 4A is a cross-sectional diagram for schematically showing an example of a casting process of the present invention for a cylinder block. Moreover.
Figure 4B:
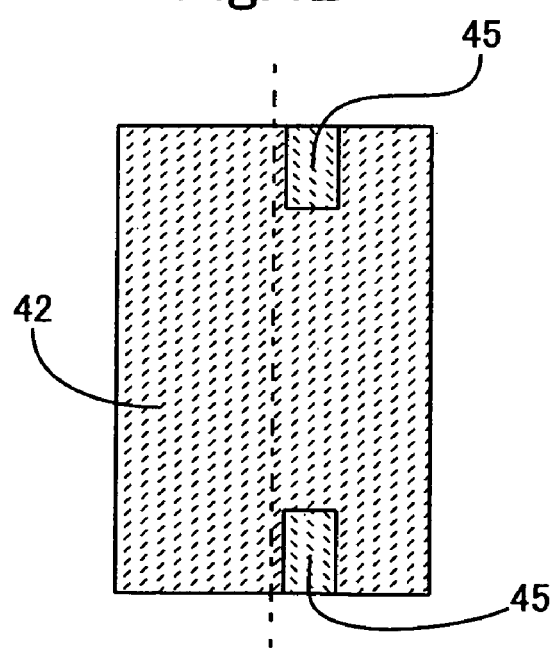
FIG. 4B is a side view for schematically showing an iron-based member of FIG. 4A.

Note that FIG. 4A is a cross-sectional view for schematically illustrating an example of a casting process of the present invention for a cylinder block. Moreover, FIG. 4B is a side view for schematically illustrating an iron-based member used in FIG. 4A, and is a diagram in which only the iron-based member is viewed from the direction of FIG. 4's arrow b. In FIG. 4, a cylindrical cylinder block, which is equipped with one cylinder bore, is illustrated for the purpose of explanation, however, it can be a cylinder block, which has a plurality of cylinder bores, as well.

The casting process of the present invention is such that a metallic composite material 40 is obtained by casting a light metal 41 around an iron-based member 42 by way of an iron-based-member allocation step and a light-metal filling step mainly.

In the iron-based-member allocation step, an iron-based member is allocated in a casting mold. The used casting mold is such that there is not any limitation in particular as far as it is a mold, which is provided with a hollow portion (comprising a portion in which the iron-based member 32 is allocated, and spaces 86, 87) forming a molding cavity surface 84, which corresponds to the shape of a cylinder block, in cooperation with a core 83 for a cylinder bore, and a pouring passage 85 into which a molten metal 41' is poured and which is communicated with the hollow portion, at least. Therefore, it can be a casting mold 80, which has a molding cavity (being equivalent to the hollow portion), which is demarcated by a plurality of molds 81-83, like FIG. 4A, but there is not any limitation in particular regarding the position and size of the pouring passage 85, ordinarily, it is advisable to employ a casting mold used for casting.

Their iron-based member is a substantially cylindrical member whose major component is iron, which is provided with a large number of through holes penetrating through the front and rear surfaces, and in which the open area ratio is 13-30%, as having been described in detail already. The iron-based member is such that it is advisable that an opened end portion of the iron-based member 42 can be brought into contact with the molding cavity surface 84, being the inner surface of the molding cavity, and can be allocated coaxially with the core for a cylinder bore with the outer space 86 and inner space 87 provided on the front- and rear-surface sides of the iron-based member 42, for instance, as shown in FIG. 4A. In this case, the outer space 86 and inner space 87 are demarcated by the iron-based member 42, and both of them are communicated at cut-offs 45. Therefore, if there is not any cut-off 45 in the iron-based member 42, the molten metal 41' of a light metal, which is poured through the pouring passage 85 in the next light-metal filling step, is filled into the outer space 86, which is positioned on a single side of the iron-based member 42, satisfactorily, however, since the iron-based member 42 is such that that the open area ratio is 13-30%, the molten metal 41' is not filled into the inner space 87 completely through the through holes, or it takes time even if being filled. Namely, since the iron-based member has the cut-offs, the molten metal of a light metal, which is poured in the light-metal filling step, passes through the cut-offs with ease, and comes in the front- and rear-surface spaces of the iron-based member satisfactorily. As a result, a cylinder block of a desired shape, which is taken along the molding cavity surface, is obtained. In particular, in accordance with the present casting process, since it is poured onto the cylinder bore surface, which is positioned on the inner-peripheral-surface side of the cylinder block and which becomes a sliding surface with respect to a piston, satisfactorily, a flat sliding surface, which is taken along the outer peripheral surface of the core for a cylinder bore, is formed. Moreover, since the molten metal is likely to pass through the cut-offs, the allocation-position deviation of the iron-based member, which is caused by the resisting force, which it receives from the flow of the poured molten metal, is suppressed.

Note that, depending on the position of the iron-based member, it is not necessarily needed to form the cut-offs, for example, there is a case where it is advisable not to form the cut-offs when among the opened end portions of the substantially cylindrical iron-based member, only one of the ends is brought into contact with the molding cavity surface.

The casting process of the present invention for a cylinder block is suitable for such a case as having a sliding surface on the internal side surface like the cylinder bore surface, however, it is needless to say that it can be applied to the manufacture of the pressure vessel and the housings of compressors, which have been described already.

The size of the cut-offs, which are formed in the iron-based member, is such that the area of one of the cut-offs can be 10-400 mm$^2$, though it depends on the size of the iron-based member. When being 10 mm$^2$ or more, the molten metal is likely to flow thereinto, and thereby the molten metal is filled into the hollow portion of the casting mold satisfactorily. Moreover, when exceeding 400 mm$^2$, it is not desirable because the strength of the metallic composite material degrades in the portion at which the cut-off is formed. On this occasion, it is desirable that the area of the cut-off can be approximately 10% of the area of the iron-based member. Note that the areas of the through holes are included in the area of the iron-based member.

Moreover, as far as being the peripheral or opened end portion of the iron-based member, there is not any limitation on the positions at which the cut-offs are formed. When the cut-offs are formed adjacent to the central portion of the iron-based member, it is not desirable because the strength of the iron-based member degrades, and because the strength of the obtained metallic composite material does not accordingly improve effectively.

In the iron-based-member allocation step, the iron-based member is such that it can be allocated in the casting mold in such a state that the both of the opened end portions are held between the molding cavity surfaces, the deviation of the iron-shaped member, which occurs during the pouring, is relieved, however, the molding cavity surfaces can desirably have a holding portion for holding the opened end portions of the iron-based member. When the opened end portions of the iron-based member are held to the holding portions which the molding cavity surfaces have, the allocation-position deviation of the iron-based member, which occurs during the pouring, is suppressed. As for the holding portions, they can be a protruded rim 831, which protrudes from the molding cavity surface to inhibit the movement of the iron-based member, as shown in FIG. 4A, or a holding groove, into which the peripheral or opened end portion of the iron-based member is fitted.

In the light-metal filling step, the molten metal of a light metal is filled into the hollow portion through the pouring passage. The molten metal of a light metal is filled into the entire hollow portion via the cut-offs with ease.

Note that a step of forming a roughened surface on the iron-shaped member, or a carburization step can be carried out prior to the iron-based-member allocation step. Moreover, after the light-metal filling step, a heat treatment can be carried out, if necessary, and thereby a thermal refining treatment for adjusting the mechanical properties of the light metal, which is turned into a matrix can be carried out, and accordingly it is possible to obtain a cylinder block whose pressure resistance is much higher. In addition, by carrying out a surface treatment, such as plating and thermal spraying, with respect to the cylinder bore surface, the sliding characteristic improves furthermore.

So far, the embodiment modes of the pressure vessel and compressor of the present invention as well as the casting process for a cylinder block have been explained, however, the pressure vessel and compressor of the present invention as well as the casting process for a cylinder block are not limited to the aforementioned embodiment modes, and can be conducted in various modes to which modifications, improvements, and the like, which one of ordinary skill in the art can carry out, are performed, within a range not departing from the scope of the present invention.

Hereinafter, examples of the pressure vessel and compressor of the present invention will be explained using FIG. 5-FIG. 10.

In order to evaluate the pressure resistance of the pressure vessels of the present examples, a flat-plate test pieces (Sample A-G and F') which comprised metallic composite members used in the pressure vessels were manufactured. Hereinafter, the manufacturing procedures of the respective samples will be explained.

Manufacture of Metallic Composite Materials

Figure 5:
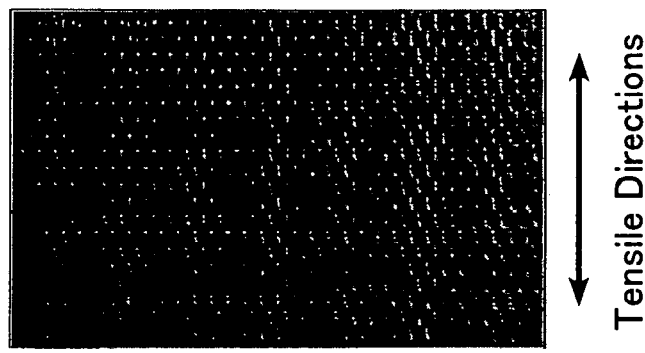
FIG. 5 is a photograph, a substitute for a diagram for showing part of an expanded metal which constitutes a metallic composite material used in a pressure vessel of an example.

An expanded metal (cold-rolled steel plate (SPCC) for industrial use, thickness: 900 μm, open area ratio: 18%, area of a through hole: 300 μm$^2$, a picture photographed from the thickness-wise direction is shown in FIG. 5), which was plate-shaped and had a plurality of through holes penetrating in the thickness-wise direction, was prepared. To the expanded metal, by performing a carbonitriding treatment, tempering or shot blasting, expanded metals M1-M5 were obtained. The treatments, which were performed to M1-M5, are set forth in Table 1. Moreover, in M4, M4' to which the same treatments were performed except that the open area ratio was adapted to 28%, was prepared.

The carbonitriding treatment was such that, after reacting C as well as N with the steel material simultaneously to generate a diffusion layer by heating the expanded metal to 650-900° C. by means of a carburizing gas including NH$_3$, oil quenching was carried out. The tempering was carried out by means of holding it at 150° C. or 550° C. for 1 hour. Moreover, the shot blasting was such that the irradiation of fibrous bullets was carried out onto the both surfaces of the expanded metal for 1 minute, respectively (2 minutes in total) Note that, in Table 1, the numerals set forth in the parentheses of M1-M5 specify the tempering temperatures, and the symbol specifies whether the shot blasting is done or not.

Figure 6:
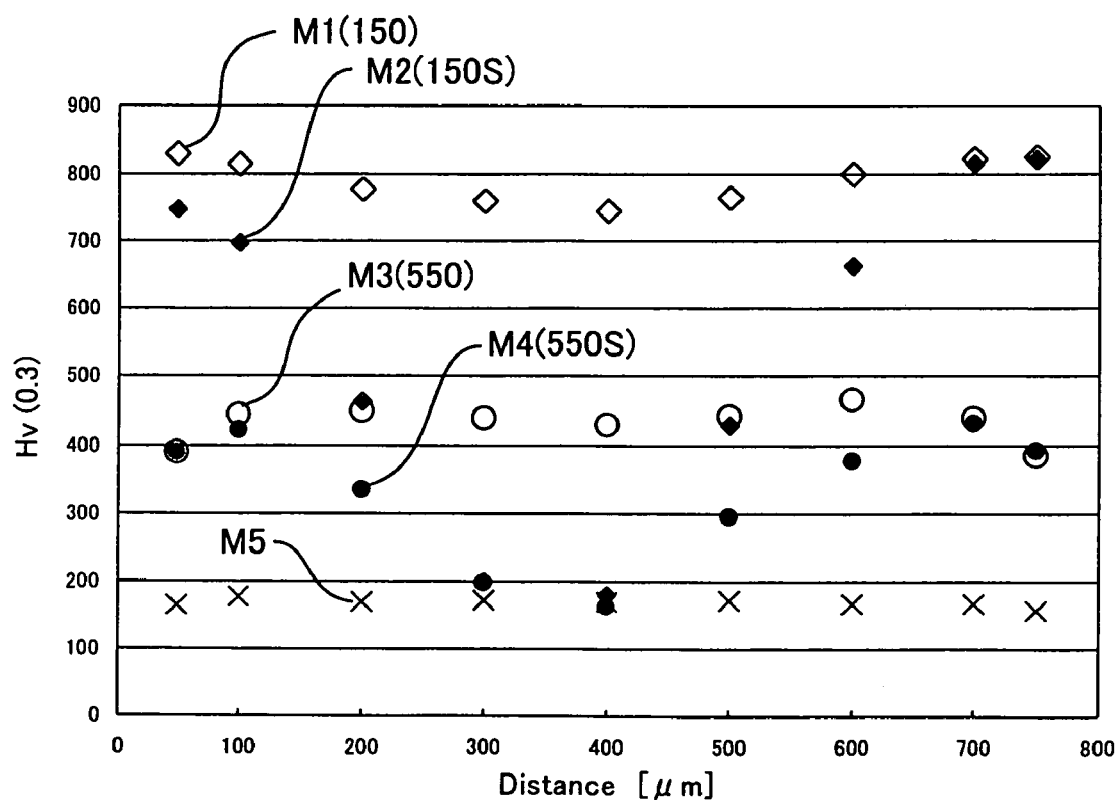
FIG. 6 is a graph for illustrating the results of measuring the Vickers hardness at respective positions in the thickness-wise direction of an expanded metal which constitutes a metallic composite material used in a pressure container of an example.
Figure 7:
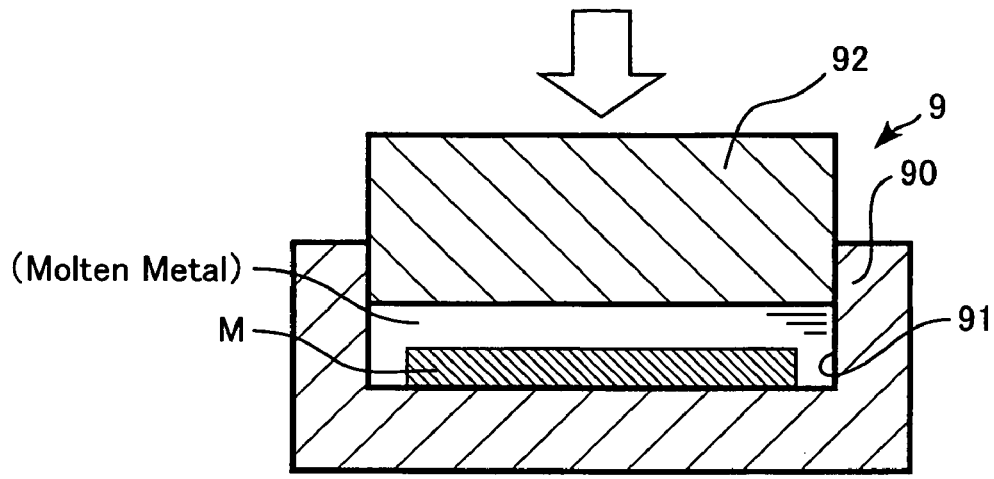
FIG. 7 is a cross-sectional diagram (a cross-sectional diagram in the thickness-wise direction of an expanded metal) for showing a mold for manufacturing samples which comprise metallic composite materials used in a pressure vessel of an example.

Regarding the obtained expanded metals M1-M5, a surface roughness measurement, a tensile test and a Vickers hardness measurement were carried out. For the surface roughness measurement, a surface roughness meter, SURFCOM 1400A (produced by TOKYO SEIMITSU) was used. The center-line average roughness, the 10-point roughness and the maximum height (they are adapted to be Ra, Rz and Rmax, respectively, and are the average values of those measured a plurality of times), which were found from the measurement results, are set forth in Table 1. The tensile test was such that the expanded metals M1-M5 were processed into a JIS flat-plate test specimen so that the tensile direction became the arrow-headed directions of FIG. 5, and thereby the measurement was carried out by means of later-described tensile-test conditions (condition I). The stresses, at which the expanded metals M1-M5 fractured, are set forth in Table 1. Moreover, the Vickers hardness measurement was such that, at the respective positions (at intervals of 100 μm) in the thickness-wise direction of the expanded metals M1-M5, the measurement was carried out from one of the sides to the other one of the sides. In this instance, the measurement load was adapted to be 300 kgf. The Vickers hardness at the respective portions (being adapted to thickness-wise distances from one of the opposite surfaces) is shown in FIG. 6. Note that, in FIG. 6, ◇ specifies M1, ◆ specifies M2, ○ specifies M3, ● specifies M4, and X specifies M5, respectively.

TABLE 1

| Expanded Metal | Carbonitriding Treatment | Tempering [° C. × 60 min.] | Shot Blasting [min.] | Surface Roughness Ra | Rz | Rmax | Fracture Stress [MPa] | Symbol of FIG. 6 |
|---|---|---|---|---|---|---|---|---|
| M1 (150) | Done | 150 | — | 0.260 | 1.234 | 2.712 | 272.6 | ◇ |
| M2 (150S) | Done | 150 | 2 | 0.366 | 1.668 | 3.668 | 299.5 | ◆ |
| M3 (550) | Done | 550 | — | 0.291 | 1.349 | 3.536 | 600.0 | ○ |
| M4 (550S) | Done | 550 | 2 | 0.708 | 3.216 | 6.955 | 606.8 | ● |
| M5 | None | — | — | 0.182 | 0.900 | 2.317 | 288.9 | X |

Next, using the expanded metals M1-M4 and M4', Samples A-F, F' and G (metallic composite materials) were manufactured. For the manufacture of the samples, a mold apparatus 9 (see FIG. 7), which comprised a lower mold 90 having a predetermined dented portion 91 of a predetermined shape, and an upper mold 92 shaped so as to contact slidably with the wall surface of the dented portion 91 to fit thereinto, was used. When manufacturing the samples, the mold temperature of the mold apparatus 9 was adapted to 200-350° C., an expanded metal M, either one of M1-M4 and M4', was placed on the bottom-surface portion of the dented portion 91 of the lower mold 90, pre-heating to 100-300° C. was carried out, in such a state, an aluminum-alloy molten metal (ADC12, and 650-800° C. molten-metal temperature) was poured into the dented portion 91. Thereafter, the upper mold 92 was inserted thereinto in the arrowheaded direction, and was pressurized (70-100 MPa) to carry out casting. Note that in the case of using 2 pieces of the expanded metals, except that the 2 pieces were placed on the dented portion 91 while being superimposed in the thickness-wise direction, casting was carried out in the same manner as aforementioned. The preparation conditions of the respective samples are set forth in Table 2.

Moreover, as comparative examples, Samples H-J, which comprised an aluminum alloy (ADC12), were manufactured. Samples H-J, except that no expanded metal was used in the aforementioned casting method, were manufactured by means of casting similarly. Note that, Samples H-J were such that they were samples all of whose compositions, and the like, were the same, though later-described tensile-test conditions differed.

Evaluation

In order to evaluate the strength of Samples A-J and F', a tensile test was carried out.

Figure 8:
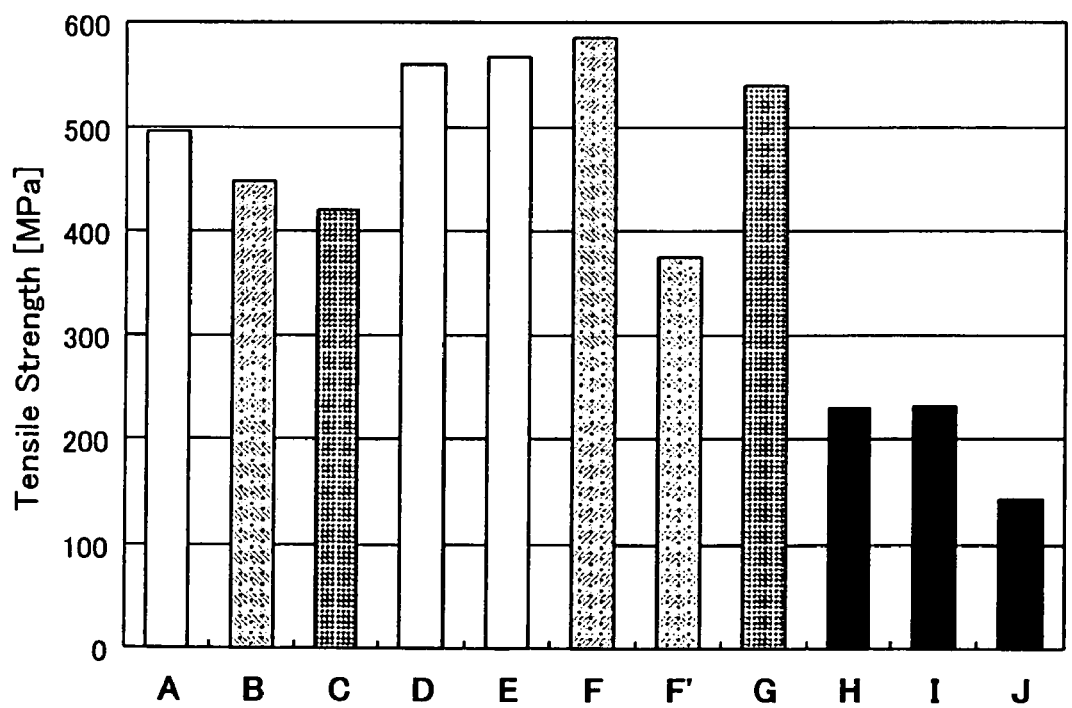
FIG. 8 is a graph for showing the results of a tensile test on Samples A-J and F' of an example.

The manufactured Samples A-J and F' were processed to a predetermined shape, and thereby JIS flat-plate test specimens (1-mm thickness) were manufactured. On this occasion, they were processed so that the tensile direction of the tensile test became the arrowheaded directions of FIG. 5 with respect to the expanded metals. Note that the tensile test carried out at a tensile speed of 0.5 mm/min. by means of 5t AUTOGRAPH (AG-5000A produced by SHIMAZU SEISAKUSHO) at room temperature (Condition I), at 180° C. after holding them at 180° C. for 100 hours (Condition II), at 200° C. after holding them at 200° C. for 5 minutes (Condition III), or at 200° C. after holding them at 200° C. for 15 minutes (Condition IV). The testing conditions of the tensile tests, which were carried out with respect to the respective samples, are set forth in Table 2, and the stresses at which the respective samples fractured are set forth in Table 2, and are shown in FIG. 8.

TABLE 2

| Sample No. | Expanded Metal | Pre-heating [° C.] | Tensile-test Condition** | Fracture Stress [MPa] |
|---|---|---|---|---|
| A | M1 (150) | 200 | I | 495.76 |
| B | M2 (150S) | 200 | II | 447.86 |
| C | M1 (150) × 2* | 200 | I | 419.30 |
| D | M3 (550) | 200 | I | 559.47 |
| E | M3 (550) | 300 | II | 566.21 |
| F | M4 (550S) | 300 | I | 584.81 |
| F' | M4' (550S) | 300 | I | 374.00 |
| G | M3 (550) × 2* | 200 | I | 539.71 |
| H | — | — | III | 229.89 |
| I | — | — | IV | 231.27 |
| J | — | — | II | 143.84 |

*2 pieces of expanded metals were superimposed to use
**I carried out the tensile test at room temperature, II carried it out at 180° C. after holding them at 180° C. for 100 hours, III carried it out at 200° C. after holding them at 200° C. for 5 minutes, and IV carried it out at 200° C. after holding them at 200° C. for 15 minutes.

Samples A-G, being the metallic composite materials, are such that the fracture stress was 400 MPa or more in all of them and they had higher strengths than Sample H-J which did not use any expanded metal. Accordingly, compressors, which used Samples A-G, had good pressure resistance. And, Samples A-G, even under such a severe condition as tensile-test test condition II where the strength degraded in the aluminum alloy alone (Sample H-J), exhibited good strengths.

Moreover, Samples D-G, which used the expanded metals M3 and M4 to which tempering was carried out at 550° C., exhibited good strength (550-MPa-or-more fracture stresses). Accordingly, compression vessels, which use Samples D-G, have especially good pressure resistance. Among them, in Sample F which used M4 to which shot blasting was performed, since the surface of the expanded metal was turned into a roughened surface suitably so that the hardness was Hv (0.3)=200-400 approximately, it exhibited especially good strength (584.8-MPa fracture stress).

Note that the expanded metals M1 and M2 to which tempering was carried out at 150° C. are such that, since the surface hardness was very high so that they were brittle, it is possible to assume that the strengths of Samples A-C stuck around 400-500 MPa approximately.

Moreover, between Sample F (18%) and Sample F' (28%) in which the open area ratio of the expanded metal differed, Sample F whose open area ratio was smaller had higher strength. However, Sample F' exhibited higher strength than Samples H-J which did not use any expanded metal.

Manufacture of Housing Member for Compressor

Figure 9:
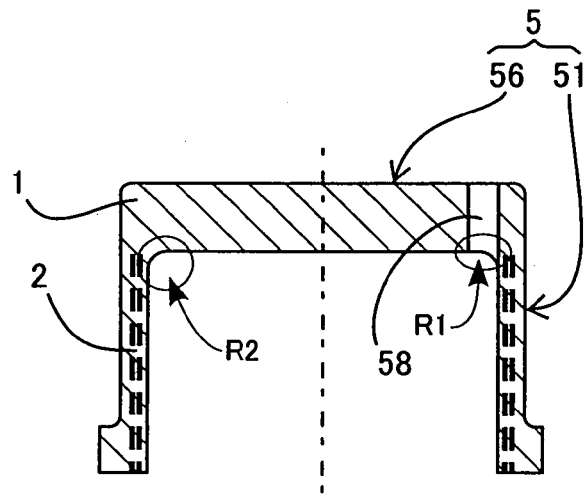
FIG. 9 is a cross-sectional diagram for schematically showing a housing member of a compressor of an example.

Next, a housing member, which constituted a housing of a compressor, was manufactured, and the pressure resistance was evaluated. Hereinafter, the manufacturing process for the housing member will be explained using FIG. 9. Note that FIG. 9 is a cross-sectional view of the manufactured housing member.

A housing member 5 was manufactured by means of casting using a mold, which was provided with a cavity conforming to the shape of the housing member 5; and which comprised a main mold, and a core. On the cavity, there was allocated a cylindrical expanded metal, which was manufactured by bending a flat-plate-shaped expanded metal (equivalent to M4 in Table 1) and welding the end surfaces facing to each other, while superimposing it in a quantity of 2 pieces. Specifically, the 2 pieces of the expanded metals were two cylinders whose inside diameters differed by thickness, and were allocated thereon coaxially with the core in such a state that one of the cylinders were inserted into the other one of the cylinders. Thereafter, an aluminum-alloy molten metal was poured into the mold to cast an aluminum alloy 1 around an expanded metal 2.

The obtained housing member 5 comprised, a substantially cylindrical peripheral-wall portion 51, and an end-wall portion 56 which was formed integrally with the peripheral-wall portion 51 and closed one of the ends of the peripheral-wall portion 51, the axial height was 81 mm, the inside diameter of the peripheral-wall portion 51 was 89.5 mm, the maximum thickness of the peripheral-wall portion 51 was 7 mm, the thickness of the end-wall portion 56 was 19 mm, the distance from the inner peripheral surface of the peripheral-wall portion 51 to the inner peripheral surface of the expanded metal was 1 mm, and the height of the expanded metal was 58 mm. Moreover, in the end-wall portion 56, a plurality of insertion holes 58 for inserting a bolt thereinto were processed.

Further, with respect to the housing member 5 after casting, the T6 heat treatment was carried out. By this heat treatment, the aluminum-alloy portion was made highly rigid.

Moreover, as a comparative example, except that the expanded metal 2 was not employed, a housing member 5' was manufactured in the same manner as the housing member 5. Note that, when the weights of the housing member 5 and the housing member 5', the housing member 5 was 835.4 g, and the housing member 5' was 718.7 g, and accordingly the weight increment was a little.

Figure 10:
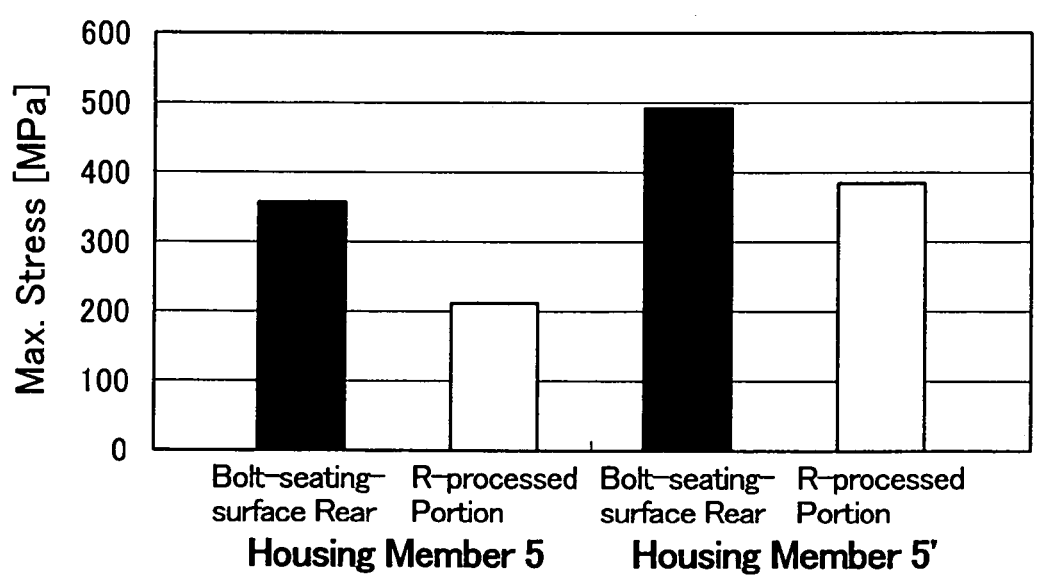
FIG. 10 is a graph for showing the simulation analysis results of a pressure resistance test which was carried out using a housing member of a compressor of an example.

With respect to the obtained housing members 5 and 5', a simulation analysis was carried out. The simulation analysis is such that the maximum stress, which acts onto the rear of a bolt-seating surface (the portion designated at R1 of FIG. 9) and onto an R-processed portion (the portion designated at R2 of FIG. 9) which comprises an intersecting portion between the peripheral-wall portion 51 and the end-wall portion 56, is found when assuming that, at room temperature, the internal pressure within a housing member is 27.5 MPa and the axial force applied to the bolt-seating surface is 17 kN. The analysis results are shown in FIG. 10.

The rear of the bolt-seating surface and R-processed portion, among the housing of the compressor, are portions onto which higher stresses are likely to concentrate. In the housing member 5' which did not use the metallic composite material, a stress of 493 MPa acted at the rear of the bolt-seating surface and a stress of 385 MPa acted at the R-processed portion; in the housing member 5, however, since the metallic composite material was used in the peripheral-wall portion 51, it became 359 MPa at the rear of the bolt-seating surface, and it became 210 MPa at the R-processed portion, thus the acting maximum stresses were reduced sharply. Namely, the housing member 5, which used the metallic composite material in the peripheral-wall portion 51, is such that the pressure resistance is high.

Note that, with respect to the housing member 5, a pressure resistance test was carried out. The pressure resistance was such that a static evaluation was carried out after fastening the bolts with 19-Nm torque at room temperature and then pressurizing the housing after filling up the inside of it with an oil to destroy it. As result, until the internal pressure reached 28 MPa, it was possible to make use of it without destroying it.

The invention claimed is:

1. A pressure vessel comprising a substantially cylindrical periphery-wall portion having an inner space, and end-wall portions closing the both opposite ends of the periphery-wall portion, and being characterized in that at least part thereof comprises:
    a metallic composite material comprising:
        a light metal being turned into a matrix; and
        a plate-shaped iron-based member which is buried in the light metal, whose major component is iron, which is provided with a large number of through holes penetrating through the front and rear surfaces, and in which the open area ratio is 13-30%.

2. The pressure vessel set forth in claim 1, wherein at least part of said periphery-wall portion comprises said metallic composite material.

3. The pressure vessel set forth in claim 1, wherein said light metal is an aluminum-based metal or a magnesium-based metal.

4. The pressure vessel set forth in claim 1, wherein said iron-based member is such that the open area ratio is 18-28%.

5. The pressure vessel set forth in claim 1, wherein said iron-based member is an expanded metal or a punching metal.

6. The pressure vessel set forth in claim 1, wherein said iron-based member is a net-shaped body comprising a plurality of wire materials.

7. The pressure vessel set forth in claim 1, wherein said iron-based member is such that the area of one through hole is 300 $\mu m^2$ or more.

8. The pressure vessel set forth in claim 1, wherein said iron-based member is such that its surface is turned into a rough surface.

9. The pressure vessel set forth in claim 1, wherein said iron-based member is such that the thickness is 0.5-2 mm.

10. The pressure vessel set forth in claim 9, wherein said iron-based member is an iron-based cured member in which carbon and nitrogen are infiltrated in all parts in the thickness-wise direction by means of carbonitriding treatment.

11. A compressor having a housing in which a compressing mechanism and a working space for compressing a gas with the compression mechanism are embedded, and being characterized in that at least part of the housing comprises:
    a metallic composite material comprising:
        a light metal being turned into a matrix; and
        a plate-shaped iron-based member which is buried in the light metal, whose major component is iron, which is provided with a large number of through holes penetrating through the front and rear surfaces, and in which the open area ratio is 13-30%.

12. The compressor set forth in claim 11, wherein:
    said compression mechanism has a piston for compressing said gas by means of reciprocal movement provided with predetermined phase; and
    said housing includes a cylinder block comprising said metallic composite material, and equipped with a plurality of cylinder bores for accommodating the piston.

13. The compressor set forth in claim 11, wherein said housing includes a front housing comprising said metallic composite material, and equipped with a hollow cylinder portion.

14. The compressor set forth in claim 11, wherein said housing has an installation portion for fastening the compressor to an installed body, the installation portion protruding outward, formed integrally and comprising said light metal, and the tensile strength of the installation portion is 460 MPa or more.

15. A process for casting a cylinder block, being characterized in that it comprises:

an iron-based-member allocation step of allocating a substantially cylindrical iron-based member, whose major component is iron, which is provided with a large number of through holes penetrating the front and rear surfaces and whose open area ratio is 13-30%, in a casting mold being provided with a hollow portion forming a molding cavity surface, which corresponds to the shape of a cylinder block, in cooperation with a core for a cylinder bore, and a pouring passage into which a molten metal is poured and which is communicated with the hollow portion, at least, coaxially with the core for a cylinder bore; and a light-metal filling step of filling said molten metal of a light metal into said hollow portion through said pouring passage;

wherein said light metal is cast around said iron-based member by way of the steps.

16. The process for casting a cylinder block set forth in claim 15, wherein:

said iron-based member has at least one cut-off at an opened end portion of the iron-based member, the cut-off being larger than the area of one of said through holes, and is allocated so that the opened end portion is brought into contact with said molding cavity surface and spaces are provided on the front- and rear-surface sides of the iron-based member in said iron-based-member allocation step; and the molten metal is filled into the entire hollow portion via the cut-off in said light-metal filling step.

17. The process for casting a cylinder block set forth in claim 15, wherein said molding cavity surface has a holding portion for holding the opened end portion of said iron-based member.

* * * * *

UNITED STATES PATENT AND TRADEMARK OFFICE
CERTIFICATE OF CORRECTION

| | |
|---|---|
| PATENT NO. | : 7,395,750 B2 |
| APPLICATION NO. | : 10/586893 |
| DATED | : July 8, 2008 |
| INVENTOR(S) | : Tanizawa et al. |

It is certified that error appears in the above-identified patent and that said Letters Patent is hereby corrected as shown below:

Item (57)

On the title page, in the Abstract

Line 3, please delete "alight metal 41" and insert therefore -- a light metal 41 --;

Line 4, please delete "iron-basedmember 42" and insert therefore -- iron-based member 42 --.

Column 1, line 27, please delete "necessary, however," and insert therefore -- necessary. However, --;

Column 1, line 33, please delete "strength of compressor's" and insert therefore -- strength of a compressor's --;

Column 1, line 37, please delete "means of drawing" and insert therefore -- means of a drawing --;

Column 2, line 42, please delete "especially, to the" and insert therefore -- especially in the --;

Column 2, line 45, please delete "because they become" and insert therefore -- because they can reach --;

Column 2, line 57, please delete "can be those in" and insert therefore -- can be that in --;

Column 3, line 10, please delete "become" and insert therefore -- reach --;

Column 3, line 12, please delete "operation, however," and insert therefore -- operation. However, --;

Column 3, line 15, please delete "becomes" and insert therefore -- reaches --;

Column 4, line 24, please delete "FIG. 2B." and insert therefore -- FIG. 2A. --;

Column 5, line 3, please delete "vessel for" and insert therefore -- vessel has for --;

Column 5, line 6, please delete "substances, has." and insert therefore -- substances. --;

UNITED STATES PATENT AND TRADEMARK OFFICE
CERTIFICATE OF CORRECTION

PATENT NO. : 7,395,750 B2
APPLICATION NO. : 10/586893
DATED : July 8, 2008
INVENTOR(S) : Tanizawa et al.

It is certified that error appears in the above-identified patent and that said Letters Patent is hereby corrected as shown below:

Column 5, line 39, please delete "secured, further," and insert therefore -- secured. Further, --;

Column 5, line 54, please delete "with certain" and insert therefore -- with a certain --;

Column 5, line 65, please delete "direction mainly." and insert therefore -- direction have such rigidity. --;

Column 6, line 5, please delete "being the thickness of" and insert therefore -- the thickness is --;

Column 6, line 35, please delete "employed, however," and insert therefore -- employed. However, --;

Column 6, line 45, please delete "that it positions" and insert therefore -- that it is positioned --;

Column 8, line 36, please delete "plate 37" and insert therefore -- plate 38 --;

Column 8, line 61, please delete "gas, moreover, a housing" and insert therefore -- gas. Moreover, it can be a housing --;

Column 9, line 11, please delete "such that, when" and insert therefore -- such that, while --;

Column 9, line 31, please delete "refining), as" and insert therefore -- refining). As --;

Column 9, line 66, please delete "FIG. 4's" and insert therefore -- FIG. 4A's --;

Column 9, line 67, please delete "FIG. 4" and insert therefore -- FIG. 4A --;

Column 10, line 2-3, please delete "block, which has a plurality of cylinder bores, as well." and insert therefore -- block which has a plurality of cylinder bores as well. --;

Column 10, line 10, please delete "used casting mold" and insert therefore -- casting mold used --;

Column 10, line 19, please delete "amolding" and insert therefore -- a molding --;

Column 10, line 21, please delete "like FIG. 4A" and insert therefore -- like in FIG. 4A --;

UNITED STATES PATENT AND TRADEMARK OFFICE
CERTIFICATE OF CORRECTION

PATENT NO. : 7,395,750 B2
APPLICATION NO. : 10/586893
DATED : July 8, 2008
INVENTOR(S) : Tanizawa et al.

It is certified that error appears in the above-identified patent and that said Letters Patent is hereby corrected as shown below:

Column 10, line 23, please delete "85, ordinarily" and insert therefore -- 85. Ordinarily, --;

Column 10, line 44, please delete "satisfactorily, however," and insert therefore -- satisfactorily. However, --;

Column 11, line 65, please delete "explained, however," and insert therefore -- explained. However, --;

Column 12, line 10, please delete "a flat-plate test pieces (Sample" and insert therefore -- flat-plat test pieces (Samples --;

Column 12, line 27, please delete "in M4, M4'" and insert therefore -- M4, M4' --;

Column 12, line 38, please delete "total) Note that," and insert therefore -- total). Note that, --;

Column 14, line 36, please delete "Sample H-J" and insert therefore -- Samples H-J --;

Column 14, line 41, please delete "(Sample H-J), exhibited good strengths." and insert therefore -- (Samples H-J), exhibited good strength. --;

Column 15, line 11, please delete "facing to" and insert therefore -- facing --; and Column 15, line 39, please delete "Note that, when" and insert therefore -- Note that, of --.

Signed and Sealed this

Third Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,395,750 B2  Page 1 of 1
APPLICATION NO. : 10/586893
DATED : July 8, 2008
INVENTOR(S) : Tanizawa et al.

It is certified that error appears in the above-identified patent and that said Letters Patent is hereby corrected as shown below:

In the Claims

Columns 17 and 18, lines 7-22 and lines 3-21, please delete claims 15, 16 and 17.

Signed and Sealed this

Ninth Day of February, 2010

David J. Kappos
*Director of the United States Patent and Trademark Office*